Patented Dec. 16, 1947

2,432,972

UNITED STATES PATENT OFFICE 2,432,972

PROCESS FOR PREPARING AN ANTHRIMIDE CARBAZOLE VAT DYESTUFF

Mario Scalera, Somerville, N. J., assignor to American Cyanamid Company, New York, N. Y., a corporation of Maine No Drawing. Application October 16, 1943, Serial No. 506,554

8 Claims. (Cl. 260—316)

This invention relates to a new and improved process of preparing the orange vat dyestuff of the formula:

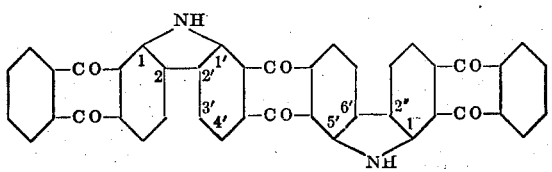

The preparation of this dyestuff is usually accomplished by the fusion of 1,1',5',1''-trianthrimide with aluminum chloride. The resulting product is very impure, brown in color, and only after oxidation with sodium hypochlorite in aqueous suspension does it turn to an orange. If the crude product is acid pasted prior to oxidation, the fine dispersion of the aqueous suspension affords better purification, and a brighter orange results. The yield loss on oxidation is very large, amounting to 30—50% of the original crude dye.

I have found, as described in my copending application, Serial No. 506,553, filed October 16, 1943, that the product even after oxidizing is not pure but actually consists of a mixture of two components, the desired dicarbazole (formulated above) which dissolves in concentrated sulfuric acid with a blue color, and an impurity, a chlorinated monocarbazole which dissolves in concentrated sulfuric acid with a red-violet color. In my copending application above referred to I have described a method for separating these two products based on their differential solubility in concentrated sulfuric acid, particularly at elevated temperatures from 100–110° C. The dicarbazole is very sparingly soluble, whereas the chlorinated monocarbazole is quite soluble and can be extracted by means of a concentrated sulfuric acid.

When the crude product is prepared by a ring closure of 1,1',5',1''-trianthrimide by any of the known processes of ring closure the proportion of dicarbazole is comparatively low, amounting usually to only 30–40% and, therefore, any method of separation, no matter how efficient it may be, will not give a high yield of the pure dicarbazole. As a result the cost of the pure dicarbazole is materially increased.

According to the present invention I have found that a greatly increased content of dicarbazole may be obtained if the aluminum chloride ring closure of trianthrimide is carried out in the presence of a nitro compound of the benzene series containing water solubilizing groups. The increase in dicarbazole content is almost double, rising from 30-40% to 50—60%. The crude product obtained may be freed from tarry byproducts by oxidation if desired and then the dicarbazole may be obtained in pure form by the extraction process described and claimed in my copending application referred to above. Much higher yields of the pure dicarbazole are thus obtainable which materially reduces its production cost.

The improvement in dicarbazole content obtainable by the process of the present invention is quite unexpected. Anthrimides contain structures which include the diphenyl amine group and diphenyl amine derivatives are well known to be very susceptible to oxidizing agents which tend to destroy them. It was, therefore, quite unexpected to find that an oxidizing agent would favor ring closure, particularly as the carbazole ring closure is not an oxidation process but rather an intramolecular re-arrangement. This ring closure has always been effected by condensing agents such as aluminum chloride, caustic alkalies or concentrated sulfuric acid, and not by oxidizing agents. In fact the ring closure gives rise to reduced compounds which are of the nature of quinhydrones.

It is not desired to limit the present invention to any chemical theory. I believe, however, that it is probable that the ring closure of the trianthrimide to the dicarbazole takes place in stages and that the intermediate form may be oxidized from the quinhydrone to the quinone stage and this may facilitate the second carbazole ring closure. The fact that the same nitro compounds do not have any favorable effect on the ring closure of 1,1'-dianthrimide would appear to support the above suggested explanation, since, of course, in the latter case the reaction cannot proceed in stages as there is only one carbazole ring formed.

The nitro compounds of the benzene series must have solubilizing groups to be effective in the process of the present invention. Nitro compounds which do not have water solubilizing groups are not effective. In fact nitrobenzene used as a solvent does not permit ring closure of unsubstituted anthrimides at temperatures below 150° C., and at temperatures above 150° C. its use leads to explosions and complete carbonization of the reaction products. The reason why a water soluble group completely changes the action of the nitro compound of the benzene series has not as yet been completely determined, and I do not wish to limit the present invention to any theory.

In addition to the primary advantage of the present invention in producing larger yields of dicarbazole a further advantage is obtained by reason of the fact that tarry byproducts are materially decreased and, therefore, less oxidizing agent is required in treating the crude carbazole products in order to brighten the dyestuff.

Another advantage lies in the fact that ring closure occurs at temperatures considerably below those required when the water soluble nitro compound of the benzene series is not used. This advantage is obtained regardless of whether the reaction is carried out in a solvent such as trichlorbenzene or in a fusion where the aluminum chloride is mixed with an alkali metal chloride such as sodium chloride. It is, of course, advantageous to use trichlorobenzene as a solvent because of improved results, but I do not claim the use of this solvent alone, apart from the soluble aromatic nitro compound which is the essential feature of the present invention in the present application, this forming the subject matter of a copending application of Smyth and Cullinan, Serial No. 506,572, filed October 16, 1943. It is, however, an advantage that the improved carbazole yield is obtainable by the present invention in the improved reaction medium.

The present invention is not critical with respect to the particular nitro compound of the benzene series. In general nitro compounds are useful if they contain solubilizing groups such as for example nitrobenzene sulfonic acids and their salts, nitrobenzoic acids and their salts, nitrophenols, etc. Apparently the nitro compounds of the present invention retain their solubility in water even after the nitro group has been reduced in the course of the reaction. This is an important advantage because it makes the separation of the nitro compound relatively simple. Alkali metal salts of meta-nitrobenzene sulfonic acid give results which are as good as those obtained with any other water soluble nitro compounds of the benzene series and as these compounds are low in cost and readily available they constitute the preferred agents for use in the process of the present invention, which, however, is not broadly limited thereto.

It is an advantage of the present invention that the amount of nitro compound to be used is not critical. The optimum amount will vary to some extent with the nature of the nitro compound, but in general best results are obtained in the range of from one-quarter to one-half part of nitro compound per part of trianthrimide, and this range is, therefore, preferred, although it is not extremely critical. Materially lower amounts of nitro compound do not show quite as large a beneficial effect and larger amounts of nitro compound are not worthwhile. In fact, if the amount becomes too large some undesirable side reactions such as chlorination may take place. The fact that the amount of nitro compound is not critical makes it a relatively simple matter to operate the process of the present invention with a maximum of reliability.

The invention will be described in greater detail in connection with the specific examples, the parts being by weight.

*Example 1*

A melt is prepared by fusing 100 parts of aluminum chloride and fifty parts of sodium chloride at 150° C. To this melt there is added gradually at 150-160° C. an intimate blend of 20 parts of 1,1',5',1" trianthrimide of the formula

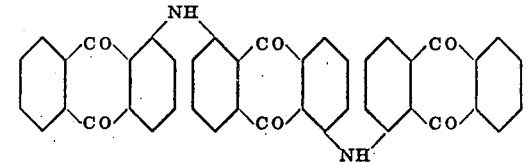

and 10 parts of the potassium salt of meta nitrobenzene sulfonic acid. The thin, smooth melt is agitated at 155-160° C. for 7 hours longer, and then poured into 1500 parts of water. The brown slurry is filtered, and washed.

The resulting press cake is oxidized in 600 parts of a sodium hypochlorite solution (5% available chlorine) at 50-100° C. until the color no longer changes. It is filtered, washed free of chlorides and dried.

The product thus obtained is an orange brown powder. It is rich in the desired dicarbazole, which may be isolated by heating the product for several hours with 98% sulfuric acid, cooling, filtering, and isolating the undissolved fraction. A yield of 8 to 9 parts is obtained. This consists of pure dicarbazole; it is soluble in concentrated sulfuric acid with blue color, and dyes cotton bright orange-yellow shades.

If the aluminum chloride sodium chloride fusion is carried out as described above, but without any nitrobenzene potassium sulfonate, the trianthrimide is recovered practically unchanged, and no carbazole products are obtained. In order to obtain carbazolization in the absence of the nitro compound, the temperature must be raised to 190-220° C., where the reaction occurs violently and exothermically, leading to a substantially less pure product.

*Example 2*

A mixture of 20 parts of 1,1',5',1" trianthrimide, 15 parts of sodium carbonate, and 5 parts of meta nitrobenzene potassium sulfonate, intimately blended in a ball mill, is gradually added to a solution of 140 parts of aluminum chloride in 140 parts of trichlorobenzene, preheated to 150° C.

During the addition, the temperature of the mixture rises gradually to 160-170° C., subsiding again toward the end of the charging. The addition may be carried out over a ½-hour period. After the addition is complete the fluid charge is agitated for ½ hour longer at 150-160° C., and drowned into 2000 parts of water while still at the same temperature.

The resulting slurry is filtered, washed free of acid, and the cake freed from adhering trichlorobenzene by steam. It is dried.

The product, obtained in theoretical yield, is pasted in 300 parts of 98% sulfuric acid at 120° C. for 3 hours. Considerable sulfur dioxide is liberated. The slurry is poured into water, and filtered. The light yellow-brown press cake is slurried into 500 parts of water, and oxidized with sodium hypochlorite at 80-90° C. until the color no longer brightens. It is then filtered, washed and dried.

There are obtained 14 to 15 parts of a bright orange powder, which colors concentrated sulfuric acid bluish purple and dyes cotton orange shades. By extraction with 220-225 parts of 98% sulfuric acid there can be isolated therefrom 11 parts of pure dicarbazole, dissolving with blue color in concentrated sulfuric acid, and dyeing cotton in pure, bright yellow-orange shades.

If the above experiment is performed as described, only omitting the meta nitrobenzene sulfonic acid salt, there are obtained, after oxidation, only 12 parts of oxidized dyestuff, dyeing duller orange shades. This in turn, on extraction with 98% sulfuric acid as mentioned above, yields only 5 to 6 parts of the pure, bright orange dicarbazole dyestuff.

*Example 3*

To a slurry of 140 parts of aluminum chloride in 140 parts of trichlorobenzene heated to 150° C. there is added an intimate blend of 20 parts of 1,1',5',1'' trianthrimide and 15 parts of the potassium salt of meta nitrobenzene sulfonic acid. The addition is carried out over a period of 30 minutes, the temperature rising to about 160° C.

After holding 30 minutes longer at that temperature, the melt is poured out into 2000 parts of water, and worked up as described in the preceding experiment.

There are obtained after oxidation 16 to 17 parts of dyestuff rich in the dicarbazole fraction.

If the fusion is carried out exactly as above, but omitting the nitrobenzene potassium sulfonate, no carbazole formation occurs, the trianthrimide being recovered almost unchanged. Carbazolization in trichlorobenzene, in the absence of the oxidizing agents of the present invention, does not occur until a temperature of 180–190° C. is reached, and then it occurs violently and suddenly.

*Example 4*

A slurry of 75 parts of aluminum chloride in 75 parts of trichlorobenzene is heated to 150° C. and while stirring constantly there is added an intimate mixture of 15 parts of 1,1',5',1'' trianthrimide and 10 parts of the sodium salt of p-nitrophenol. The temperature rises rapidly and must be controlled by the rate of addition.

The melt is taken up in 1000 parts of water, filtered, and the cake is slurried in dilute caustic soda, filtered and washed. The product is dried.

The product, when further treated as described in Example 2, gives a high yield of dyestuff which is rich in the desired dicarbazole component.

I claim:

1. A method of preparing a product containing relatively large amounts of 1,1',5',1''-trianthrimide-2,2',6',2''-dicarbazole, which comprises reacting 1,1',5',1''-trianthrimide with aluminum chloride in the presence of a water soluble nitro compound of the benzene series.

2. A method of preparing a product containing relatively large amounts of 1,1',5',1''-trianthrimide-2,2',6',2''-dicarbazole, which comprises reacting 1,1',5',1''-trianthrimide with aluminum chloride in the presence of an amount of a water soluble nitro compound of the benzene series from one-quarter to one-half the amount of the trianthrimide.

3. A method of preparing a product containing relatively large amounts of 1,1',5',1''-trianthrimide-2,2',6',2''-dicarbazole, which comprises reacting 1,1',5',1''-trianthrimide with aluminum chloride in the presence of a compound included in the group consisting of meta-nitrobenzene sulfonic acid and its alkali metal salts.

4. A method of preparing a product containing relatively large amounts of 1,1',5',1''-trianthrimide-2,2',6',2''-dicarbazole, which comprises reacting 1,1',5',1''-trianthrimide with aluminum chloride in the presence of an amount of a compound included in the group consisting of meta-nitrobenzene sulfonic acid and its alkali metal salts from one-quarter to one-half the amount of the trianthrimide.

5. A method according to claim 1 in which the reaction with aluminum chloride takes place in the presence of trichlorobenzene as a solvent.

6. A method according to claim 2 in which the reaction with aluminum chloride takes place in the presence of trichlorobenzene as a solvent.

7. A method according to claim 3 in which the reaction with aluminum chloride takes place in the presence of trichlorobenzene as a solvent.

8. A method according to claim 4 in which the reaction with aluminum chloride takes place in the presence of trichlorobenzene as a solvent.

MARIO SCALERA.

REFERENCES CITED

The following references are of record in the file of this patent:

UNITED STATES PATENTS

| Number | Name | Date |
| --- | --- | --- |
| 1,900,350 | Kranzlein et al. | Mar. 7, 1933 |
| 2,073,022 | Mieg et al. | Mar. 9, 1937 |
| 2,369,951 | Dettwyler et al. | Feb. 20, 1945 |
| 2,258,394 | Tinker et al. | Oct. 7, 1941 |